United States Patent
Harding et al.

(10) Patent No.: US 12,189,749 B2
(45) Date of Patent: Jan. 7, 2025

(54) CONTEXT-BASED ACCESS CONTROLS

(71) Applicant: Amazon Technologies, Inc., Seattle, WA (US)

(72) Inventors: Gregory Leighton Harding, Cape Town (ZA); Tai Geoffrey Lucas, Cape Town (ZA); James Alfred Gordon Greenfield, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/687,435

(22) Filed: Nov. 18, 2019

(65) Prior Publication Data
US 2020/0082065 A1     Mar. 12, 2020

Related U.S. Application Data

(63) Continuation of application No. 14/862,060, filed on Sep. 22, 2015, now Pat. No. 10,482,231.

(51) Int. Cl.
G06F 21/33     (2013.01)

(52) U.S. Cl.
CPC ................... G06F 21/33 (2013.01)

(58) Field of Classification Search
CPC ........ G06F 21/33; G06F 21/6218; G06F 8/65; G06F 11/0751; G06F 11/079; G06F 11/0793
See application file for complete search history.

(56) References Cited

U.S. PATENT DOCUMENTS

| | | | |
|---|---|---|---|
| 6,055,637 A * | 4/2000 | Hudson | G06F 21/6218 709/225 |
| 8,156,420 B2 | 4/2012 | Nie | |
| 8,364,666 B1 * | 1/2013 | Katzir | H04L 63/306 707/723 |
| 8,458,783 B2 | 6/2013 | Walters | |
| 8,700,663 B2 | 4/2014 | Stephens, Jr. | |

(Continued)

OTHER PUBLICATIONS

"Amazon Web Services: Overview of Security Processes," May 2011, <http://www.utdallas.edu/.about.muratk/courses/cloud11f_files/AWS_Security_Whitepaper.pdf> [retrieved Sep. 29, 2015], pp. 1-24.

(Continued)

*Primary Examiner* — Techane Gergiso
(74) *Attorney, Agent, or Firm* — Davis Wright Tremaine LLP

(57) ABSTRACT

A system includes access controls that allow or deny a request based at least in part on a context associated with the request. A service receives a request from a client, and forwards information that describes the request and the context of the request to a context management service. The context management service determines whether the request should be allowed by querying a set of context validation plugins. Each context validation plugin analyzes particular characteristics of a request's context, and based at least in part on the request's context, indicates to the context management service that the request should be allowed or denied. If a quorum of the context validation plugins indicate to the context management service that the request should be allowed, the context management service indicates to the service that the request is allowed within the provided context.

20 Claims, 12 Drawing Sheets

(56) References Cited

U.S. PATENT DOCUMENTS

| | | | |
|---|---|---|---|
| 8,819,763 B1* | 8/2014 | Cheung | H04L 63/10 726/1 |
| 8,955,079 B2 | 2/2015 | Mani | |
| 9,137,247 B2* | 9/2015 | Smith | H04L 63/06 |
| 9,349,016 B1* | 5/2016 | Brisebois | H04L 63/20 |
| 9,426,182 B1* | 8/2016 | Zeljko | H04L 63/08 |
| 9,767,273 B2* | 9/2017 | Van Riel | G06F 21/53 |
| 10,068,102 B2* | 9/2018 | Chakra | G06F 21/6218 |
| 2002/0073320 A1* | 6/2002 | Rinkevich | G06F 21/31 713/183 |
| 2002/0116453 A1 | 8/2002 | Todorov | |
| 2002/0124067 A1* | 9/2002 | Parupudi | G06F 21/62 709/238 |
| 2002/0184217 A1* | 12/2002 | Bisbee | H04L 63/123 |
| 2005/0138192 A1* | 6/2005 | Encarnacion | H04L 67/12 709/230 |
| 2005/0144457 A1* | 6/2005 | Lee | H04L 63/126 713/176 |
| 2005/0149726 A1 | 7/2005 | Joshi | |
| 2006/0190989 A1* | 8/2006 | Furuya | G06F 21/6218 726/2 |
| 2007/0006321 A1* | 1/2007 | Bantz | G06F 21/6218 726/27 |
| 2007/0094501 A1 | 4/2007 | Takamizawa | |
| 2007/0121508 A1 | 5/2007 | Fodor | |
| 2007/0287474 A1* | 12/2007 | Jenkins | H04W 4/02 455/456.2 |
| 2008/0222694 A1* | 9/2008 | Nakae | H04L 63/20 726/1 |
| 2008/0228721 A1* | 9/2008 | Wahl | G06Q 10/109 |
| 2009/0228963 A1* | 9/2009 | Pearce | G06F 21/31 726/5 |
| 2009/0300364 A1* | 12/2009 | Schneider | H04L 9/3247 713/178 |
| 2009/0313599 A1 | 12/2009 | Doddavula | |
| 2010/0093315 A1 | 4/2010 | Grosch | |
| 2010/0100950 A1* | 4/2010 | Roberts | H04L 63/08 709/229 |
| 2010/0146085 A1 | 6/2010 | Van Wie | |
| 2011/0131581 A1 | 6/2011 | Auernhammer | |
| 2011/0145735 A1 | 6/2011 | Driesner | |
| 2011/0239270 A1* | 9/2011 | Sovio | H04W 4/60 726/1 |
| 2011/0314549 A1 | 12/2011 | Song | |
| 2011/0321123 A1* | 12/2011 | Ishikawa | G06F 21/6218 726/1 |
| 2012/0019867 A1 | 1/2012 | Prati | |
| 2012/0030243 A1* | 2/2012 | Ishikawa | G06F 21/604 707/785 |
| 2012/0233314 A1 | 9/2012 | Jakobsson | |
| 2013/0024630 A1 | 1/2013 | Campbell | |
| 2013/0191397 A1* | 7/2013 | Avadhanam | G06F 16/24578 707/E17.084 |
| 2013/0191882 A1 | 7/2013 | Jolfaei | |
| 2013/0212484 A1* | 8/2013 | Joshi | H04L 67/04 715/740 |
| 2013/0219510 A1 | 8/2013 | Seleznev | |
| 2013/0226878 A1* | 8/2013 | Sankaranarayanan | G06F 16/2365 707/689 |
| 2013/0227704 A1 | 8/2013 | Boivie | |
| 2013/0290247 A1* | 10/2013 | Parks | G06F 16/182 707/609 |
| 2014/0006620 A1 | 1/2014 | Assuncao | |
| 2014/0053241 A1 | 2/2014 | Norrman et al. | |
| 2014/0108792 A1* | 4/2014 | Borzycki | H04L 67/567 713/165 |
| 2014/0128021 A1* | 5/2014 | Walker | H04L 43/16 455/405 |
| 2014/0143149 A1* | 5/2014 | Aissi | G06F 21/316 705/44 |
| 2014/0189808 A1* | 7/2014 | Mahaffey | G06F 21/6245 726/4 |
| 2014/0201814 A1 | 7/2014 | Barkie | |
| 2014/0208401 A1 | 7/2014 | Balakrishnan | |
| 2014/0280520 A1* | 9/2014 | Baier | H04L 67/02 709/203 |
| 2014/0280856 A1 | 9/2014 | Liu | |
| 2014/0282586 A1 | 9/2014 | Shear et al. | |
| 2015/0095269 A1 | 4/2015 | Matignon | |
| 2015/0106888 A1* | 4/2015 | Cheng | H04L 63/10 726/5 |
| 2015/0135258 A1* | 5/2015 | Smith | H04L 63/0876 726/1 |
| 2015/0135312 A1* | 5/2015 | Wada | G06F 11/3409 726/22 |
| 2015/0222606 A1* | 8/2015 | Yan | H04L 9/0847 713/171 |
| 2015/0269383 A1* | 9/2015 | Lang | G06F 21/57 726/1 |
| 2015/0319154 A1 | 11/2015 | Balakrishnan | |
| 2015/0365412 A1* | 12/2015 | Innes | H04L 63/12 726/7 |
| 2015/0379293 A1 | 12/2015 | Wang | |
| 2016/0044013 A1 | 2/2016 | Belov | |
| 2016/0112397 A1* | 4/2016 | Mankovskii | H04L 63/105 726/6 |
| 2016/0134634 A1* | 5/2016 | Rosendal | H04W 12/065 726/4 |
| 2016/0182404 A1* | 6/2016 | Rastogi | H04L 47/829 709/225 |
| 2016/0191415 A1* | 6/2016 | Reddy | H04L 41/0893 709/226 |
| 2016/0285911 A1* | 9/2016 | Goldman | G06F 21/44 |

OTHER PUBLICATIONS

"Issue Tracking System," Wikipedia, The Free Encyclopedia, Jun. 4, 2015, <https://en.wikipedia.org/wiki/Issue_tracking_system> [retrieved Sep. 29, 2015], 3 pages.

"IT Change Management," Change Control, Solar Winds, <http://www.solarwinds.com/solutions/it-change-management.aspx> [retrieved Sep. 29, 2015], 3 pages.

* cited by examiner

CONTEXT-BASED ACCESS CONTROLS

CROSS-REFERENCE TO RELATED APPLICATIONS

This application is a continuation of U.S. patent application Ser. No. 14/862,060 filed Sep. 22, 2015, entitled "CONTEXT-BASED ACCESS CONTROLS," the disclosure of which is incorporated by reference in its entirety.

BACKGROUND

Access control is an important aspect of managing a computer system. Many conventional computer systems provide access control by authenticating the identity of a requesting client and then authorizing a request provided by the client based at least in part on the identity of the client. The identity of the requesting client can be authenticated in a variety of ways. In some systems, the identity of the requesting client is authenticated by validating a set of credentials that are provided with a request. Credentials used to authenticate a client can include a username and password, biometric information, or a cryptographic signature that is included with the request. Once the requesting client is identified and authenticated, an authorization process accesses a database of authorization policies and determines a set of access rights associated with the requester's identity. If the set of access rights is insufficient to complete the request, the request is denied. If the set of access rights is sufficient, then the request is granted.

If an attacker acquires the credentials of an authorized client, the attacker can impersonate the authorized client and may be able to perform any action for which the client has been granted sufficient rights. For example, if the authorized client has the right to delete an item from a database, the attacker can also delete an item, or even every item, from the database.

BRIEF DESCRIPTION OF THE DRAWINGS

Various embodiments in accordance with the present disclosure will be described with reference to the drawings, in which.

DETAILED DESCRIPTION

Figure 1:
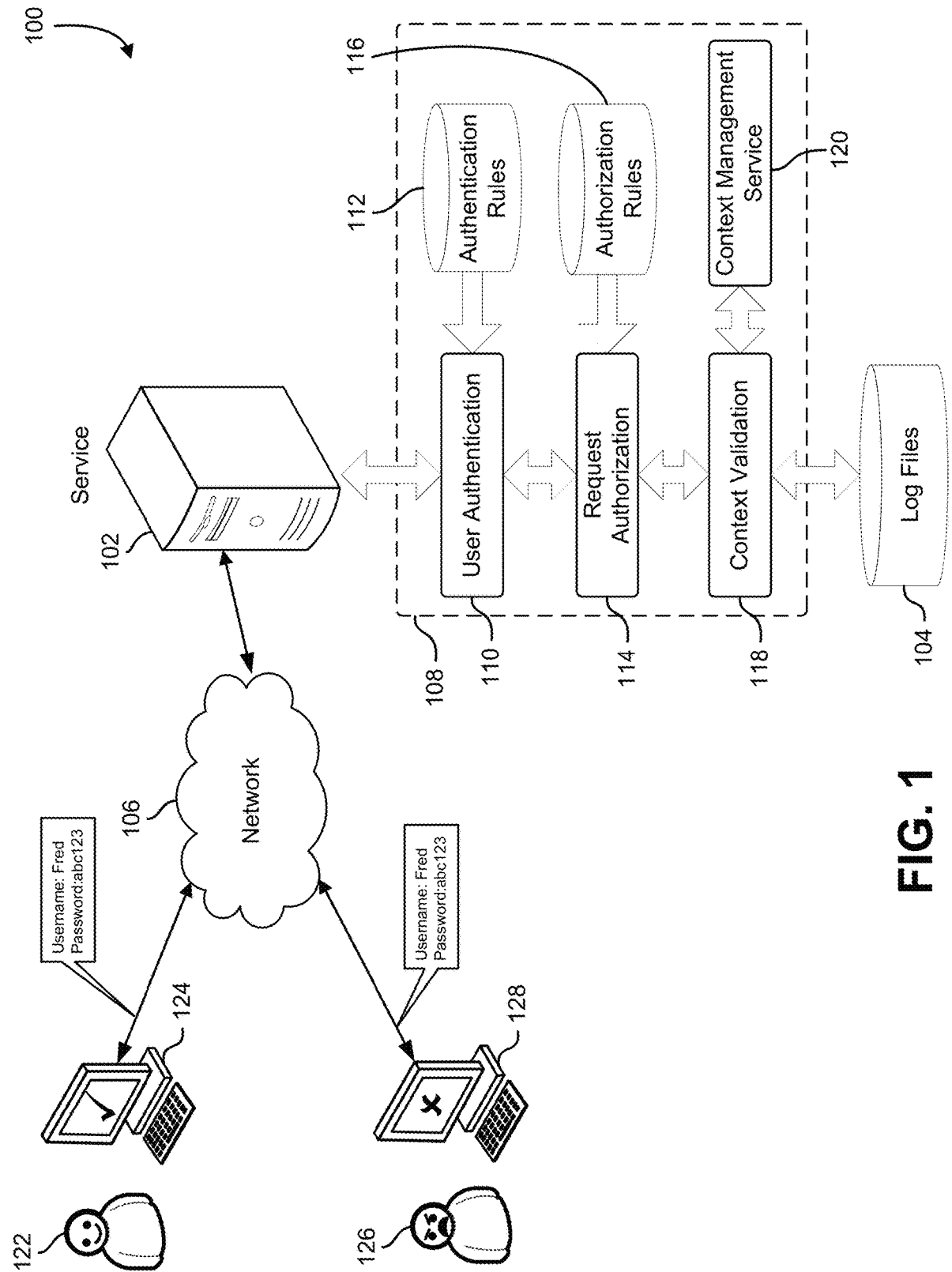
FIG. 1 shows an illustrative example of an environment in which various embodiments may be practiced.

The current document describes various systems and methods that provide access controls for a computer system or service by analyzing contextual information that is related to a request to determine whether or not the request should be allowed. Context-based validation may be used in addition to other access control methods such as those that authenticate the identity of a requester and then authorize a request using the authenticated identity. When used in combination with other access control methods, context-based validation may reduce the blast radius of a successful identity-based attack by constraining the allowable actions of the attacker using the context of the attacker's requests.

In various examples, a requester sends a request to a service. The service authenticates the requester by confirming an identity that is associated with the requester using a username and password, digital signature, biometric response, physical key, or other method. Using the confirmed identity, the service identifies a set of access rights and privileges that have been granted to the requester. If the access rights privileges are sufficient to perform the request, the service determines that the request is authorized. Before the request is performed, information related to the context of the request is assembled and validated against the request and the identity of the requester. If the context of the request is not in accordance with the request itself, the request is denied despite being authorized by an authentic requester.

Various kinds of contextual information can be used to perform context-based authentication. In some implementations, time and date context information is used to perform context-based authentication. In one example, a requester submits a request to a service at a particular date and time. The system compares the time of the request to the normal working hours of the requester, which are retrieved from a personnel database. If the request is made outside the normal working hours of the requester, the request is denied even if the requester has authenticated to the service in other ways. The characteristics of the request are compared to a set of restrictions maintained in a change management calendar. If, based at least in part on the date of the request, the type of request is restricted, the request is denied. If the request is of a type that is retrieving information, and the requested information includes time and date metadata, the time and date metadata can also be used to perform context-based authentication. For example, if logs are requested by the requester, but the date of the logs is outside an allowable date window, a request for the logs can be denied.

Forms of contextual information such as ticketing information, access rate information, and request-risk measures can also be used to perform context-based authentication. In various examples, a context management service records the rate at which a particular requester makes requests to a service, or the rate at which the service processes requests from a particular requester. If a large number of requests are received by the service from the particular requester such that the request rate from the particular requester exceeds a threshold request rate, additional requests will be denied and, in some implementations, the threshold request rate may be reduced. In some examples, a ticket that describes a work task to be completed is matched to a request and used to determine that the request is appropriate to the matching ticket. If the request is not appropriate for the matching ticket, or if no ticket matches the request, the request is denied. In other examples, a risk score is determined for a request. In some embodiments, if the risk score is greater than a threshold value the request is denied. In other embodiments, the risk score is combined with the risk score from previous requests to determine a risk rate. If the risk rate exceeds a maximum risk rate, the request is denied.

Context-based authentication can be performed using a context management service. In some embodiments, the context management service is part of an authentication system within a service or computer system. In other embodiments, the context management service is an external component accessed by a service during the request authorization process. When a service requests context-based validation of a request, the context management service is provided with information regarding the request, the identity of the requester, and in some implementations, certain contextual information relating to the requester and the request. The context management service can acquire additional context information and context constraints from other services such as calendaring systems, change control systems, ticketing systems, risk-management systems, and other business systems. The context management service can contain context-validation components that apply particular context constraints based at least in part on the availability of particular context information regarding the request. The context management service analyzes the request, and based at least in part on the available context information, determines whether the request should be allowed by the service or computer system. If the context management service determines that the request should be allowed, the context management service provides an authorization message to the service or computer system that provided the request for context-based validation. In some implementations, the authorization message is in the form of a digitally signed token.

In various embodiments, the context management service includes a number of context validation plugins. Each context validation plugin applies various context-based constraints to a request based at least in part on the availability of appropriate context information for the request. The context management service combines the validation results from the context validation plugins to produce either a final authorization or a final denial for the request. The context management service can support any number of context validation plugins such as time-limiting plugins, ticket-limiting plugins, data-windowing plugins, rate-limiting plugins, change-management plugins, and plugins that limit the number of-impact operations.

FIG. 1 shows an illustrative example of a system 100 of an environment in which various embodiments may be practiced. A system 100 includes a service 102. The service 102 can be hosted by a computer system or by a group of computer systems. In the illustrated example, the service 102 hosts a collection of log files 104, portions of which are provided to users that access the service 102 using client computer systems that are connected to the service 102 over a computer network 106. In other examples, the service 102 can provide general computing services, database services, virtual computing services, data storage services, retail shopping services, or other services.

The service 102 includes a collection of authentication components 108. The collection of authentication components determines whether a request received by the computer network 106 for granted or denied. A user authentication component 110 accesses a set of authentication rules 112 to verify the identity of the requester that transmitted the request. In some examples, the user authentication component 110 receives a username and a password. The user authentication component 110 accesses the set of authentication rules 112 to determine that the username and the password are correct. If the username and the password are correct, the user authentication component 110 determines that the identity of the requester is the identity associated with the provided username. A request authorization component 114 accesses a set of authorization rules 116 and determines, based at least in part on the nature of the request and the identity of the requester, whether to authorize the request. In some examples, the request authorization component 114 receives the authenticated identity of the requester and the request from the user authentication component 110. The request authorization component 114 identifies applicable rights and permissions from the set of authorization rules 116 based at least in part on the identity of the requester. If the rights and permissions are sufficient to fulfill the request, the request is authorized by the request authorization component 114. If the rights and permissions are not sufficient to fill the request, the request is denied by the request authorization component 114.

A context validation component 118 receives the authenticated identity of the requester from the user authentication component 110 and the authorized request from the request authorization component 114. Information regarding the context of the request is provided to the context validation component 118 by the service 102. The context information, information relating to the request, and the identity of the requester are provided to a context management service 120. The context management service 120 evaluates the context information and determines whether the request is in accordance with the provided context. In some implementations, the context management service 120 acquires additional context information that is analyzed to determine whether the request should be allowed. If the context management service 120 determines that a request is in accordance with the context of the request, the context management service 120 indicates to the context validation component 118 that the context is valid, and that the request should be allowed. If the context management service 120 determines that the request is not in accordance with the context of the request, the context management service can take a number of actions such as communicating the violation to an administrative console, adjusting various context-based constraints based at least in part on feedback received from an administrator, and communicating to the context validation component 118 that the request should be denied.

When an authorized user 122 sends a request to the service 102, the authorized user 122 authenticates to the service 102 using a client computer system 124. In the illustrated example, the authorized user 122 provides a username 'Fred', and a password 'abc123' to prove the identity of the authorized user 122. In other examples, the authorized user 122 provides a digital signature, a biometric input such as a retina scan or fingerprint, or a code from an authentication device. Using the set of authentication rules 112 the user authentication component 110 determines that the authentication information provided by the authorized user 122 is correct, and authenticates the identity of the authorized user 122. The request authorization component 114 queries the set of authorization rules 116 and determines that the request is authorized.

The context validation component 118 identifies the requested portion of the log files 104, and provides the date and time ranges associated with the requested portion of the log files to the context management service 120. The context management service 120 receives the identity of the authorized user 122, and retrieves schedule information that describes the normal working hours when the authorized user 122 is expected to be accessing the service 102. The service 102 provides a ticket to the context management service 120 that describes a work item associated with the request. If the time of the request is not within the normal working hours of the authorized user 122, the context management service 120 indicates to the context validation component 118 that the request should be denied. If the nature of the request is not in accordance with the work item described by the ticket provided by the service 102, the context management service 120 communicates to the context validation component 118 that the request should be denied. If the date range associated with the portion of the log file information requested by the authorized user 122 is outside the range of allowable dates, the context management service 120 indicates to the context validation component 118 that the request should be denied. If the context management service 120 receives insufficient context information to validate the request, the context management service 120 may indicate to the context validation component that the request should be denied. Insufficient context information is provided, and the context management service 120 determines that the request is in accordance with the provided context information, the context management service 120 indicates to the context validation component 118 that the request should be allowed. In some implementations, the context management service 120 provides a digitally signed token to indicate that the request should be allowed. In various implementations, additional contextual validation may occur based at least in part on the availability of additional context, and the availability of additional context validation plugins.

When an unauthorized user 126 attempts to send a request from an unauthorized client computer system 128, the context management service 120 may restrict the allowed requests using the contextual information, even when the unauthorized user 126 has access to the credentials of the authorized user 122. In one example, the unauthorized user 126 requests a large amount of log file information from the service 102. The context validation component 118 determines that the requested log file information is associated with a broad range of dates. The context management service 120 determines that, although the credentials provided by the unauthorized user 126 would otherwise authorize the request, the broad range of dates associated with the requested log file information causes the request to be denied. In another example, the unauthorized user 126 sends a request to the service 102 outside the normal working hours of the authorized user 122. The context management service 120 determines that the request has arrived outside the normal working hours of the authorized user 122, and indicates to the context validation component 118 that the request should be denied. In yet another example, the unauthorized user 126 provides a request to the service 102, but the request is not associated with the work ticket. No work ticket is provided to the context validation component 118, and no work ticket is provided to the context management service 120. The context management service 120 determines that since the request is not associated with a ticket, the request should be denied. By confirming that incoming requests are in accordance with associated contextual information, the system 100 can limit the amount of damage caused by an attacker that is able to acquire the credentials of an authorized user.

Figure 2:
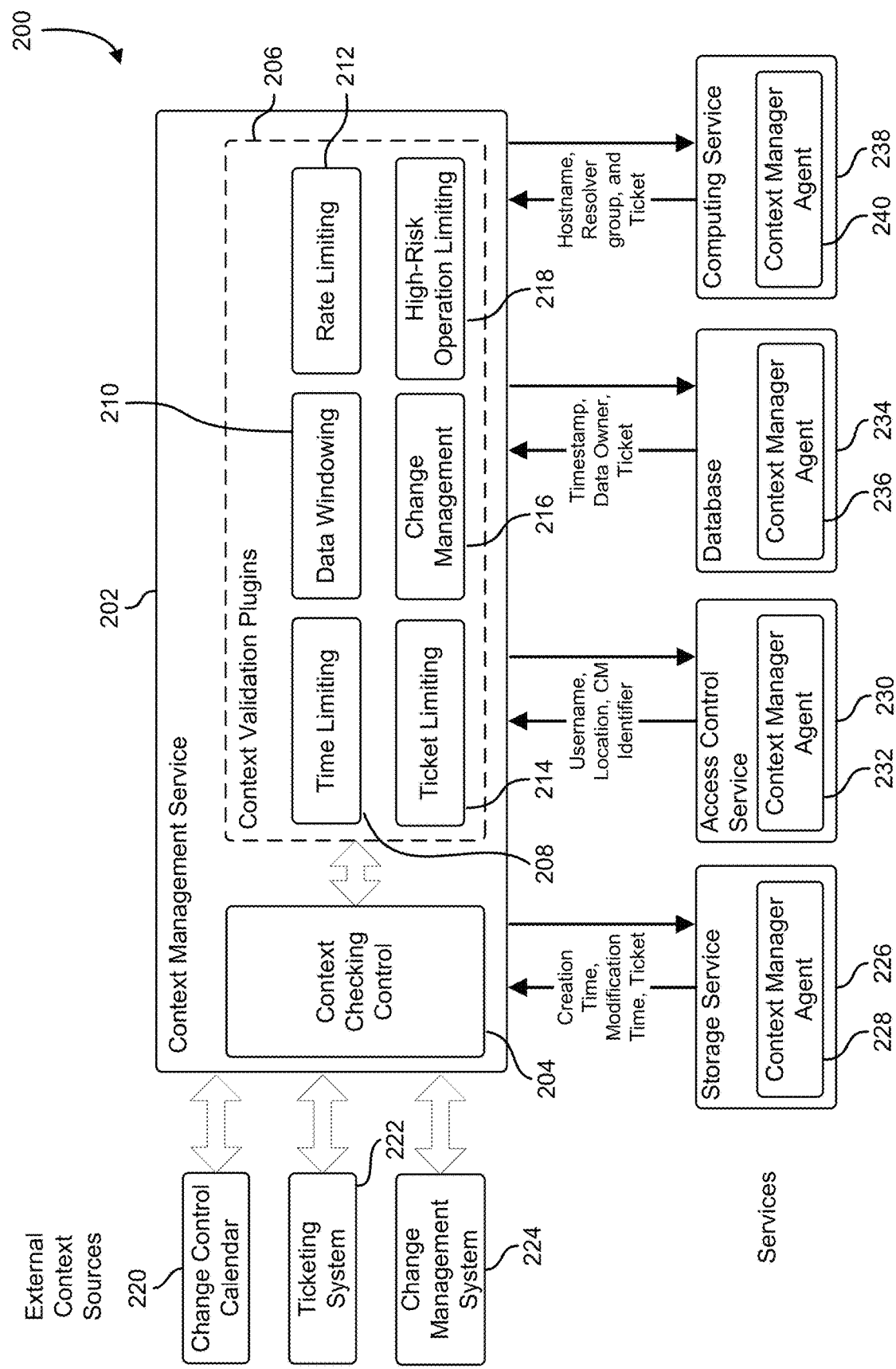
FIG. 2 shows an illustrative example of a system that provides context-based authorization of service requests, in accordance with an embodiment.

FIG. 2 shows an illustrative example of a system 200 that provides context-based authorization of service requests, in accordance with an embodiment. A system 200 includes a context management service 202 that analyzes requests and request contexts that are provided by a number of services, and determines whether a particular request is in accordance with the particular request's context. If the particular request is in accordance with the particular requests context, then the context management service 202 recommends to the service that provided the particular request that the particular request be allowed. The context management service 202 includes a context checking control component 204 and a set of context validation plugins 206. The context checking control component 204 includes components that parse the request and context information that is provided to the context management service 202. The context checking control component 204 uses the set of context validation plugins 206 to analyze the provided request and context information, and determines whether the request is in accordance with the context of the request based at least in part on the results returned from each context validation plugin in the set of context validation plugins 206. The set of context validation plugins 206 includes a time limiting plugin 208, a data windowing plugins 210, a rate limiting plugin 212, a ticket limiting plugin 214, a change management plugin 216, and a high-risk operation limiting plugin 218. Additional context validation plugins may be added to or removed from the system based at least in part on the availability of contextual information for a request, and the context-based constraints that are to be enforced.

The various context validation plugins in the set of context validation plugins 206 receive context information that is associated with a request from a number of external sources. A number of external content sources are illustrated in FIG. 2. A change control calendar 220 is a calendaring system that describes various time-based restrictions (e.g., date-based restrictions), time periods, or date ranges during which particular operations or classes of operations are prohibited or restricted. For example, a software development company may impose a policy that changes to source code are restricted within 30 days of a major release milestone. In another example, an online retailer restricts changes to critical IT systems between Thanksgiving and Christmas. The change control calendar 220 can contain entries that describe these and other date-range-based restrictions.

A ticketing system 222 provides information about work items that are part of a business workflow. When work is requested, a ticket is generated that includes a description of the work be performed and information about the nature of the work. The ticketing system 222 can be used by the set of context validation plugins 206 to verify that a request to perform an operation is not allowed unless there is an active ticket that requires the operation to be performed as part of a particular work item. In one example, the ticket limiting plugin 214 is provided with information about a request and a ticket identifier. The ticket limiting plugin 214 provides the ticket identifier to the ticketing system 222, and the ticketing system 222 provides the ticket limiting plugin 214 with information relating to the work item that is represented by the ticket identifier. If the request describes an operation that is not in accordance with the work item represented by the ticket identifier, the ticket limiting plugin 214 communicates to the context checking control that the request should not be allowed. For example, if the request is a request to delete a purchase record from a database, and the ticket represents a work item to add a new customer record to a customer table, the request is not in accordance with the ticket because it is not necessary to delete a purchase record from the database to add a new customer record. In another example, if the request is to add a new shipping address to the database, and the ticket represents a work item to add a new customer, then the request and the ticket are in accordance with each other because it may be necessary to add a new shipping address when adding a new customer.

A change management system 224 may be used to track changes to IT infrastructure within the enterprise. The change management system 224 maintains change control documents that track the approvals and actions associated with expansions and changes to the computing infrastructure of the business. The change management plugin 216 can access information from the change management system 224 to confirm that requests to change IT infrastructure have been properly documented and approved. If the change management plugin 216 receives a request that has not been properly documented and approved in the change management system 224 the request can be denied even if the requester has sufficient rights to otherwise perform the request.

A number of services access the context management service 202 in order to determine whether a request made by a client of the service should be granted. The storage service 226 provides network-based data storage services to clients. When the client provides a request to the storage service 226, the storage service 226 authenticates the identity of the requesting client, and authorizes the request if the rights and privileges granted to the client are sufficient to perform the request. If authentication and authorization are successful, information related to the request and the context of the request are provided to a context manager agent 228. The context manager agent 228 contacts the context management service 202 and provides the context management service 202 with various contextual information. In various examples, the context manager agent 228 provides the context management service 202 with context information such as creation and modification times for requested files stored on the storage service 226, a ticket identifier associated with the ticketing system 222, or a change management system identifier associated with the change management system 224. The context management service 202 parses the provided information and provides the parsed information to a selection of context validation plugins. Each context validation plugin in the selection of context validation plugins evaluates the request and the context and indicates to the context checking control component 204 whether the request should be allowed based at least in part on the provided context information. The context checking control component 204 combines the indications into a single response that is returned to the storage service 226.

An access control service 230 provides identity and rights management. The access control service 230 can provide permissions for a variety of resources such as cloud computing resources, online storage resources, and online database resources. Identities can be verified by the access control service 230 using multifactor authentication and identity federation techniques. When the access control service 230 receives a request to modify user account information, alter permissions associated with the user account, or authenticate using a federated identity management service, the request can be validated using a context manager agent 232 that accesses the context management service 202. In one example, the context manager agent 232 provides the context management service 202 with a username, a site location, and the change management identifier. The change management plugin 216, contacts the change management system 224 and retrieves a change management record using the change management identifier. The change management plugin 216 confirms that the account and permission changes have been approved and are in accordance with the retrieved change management record. If the account and permission changes are in accordance with the information retrieved from the change management system 224, the context checking control component 204 indicates to the context manager agent 232 that the request is approved by the context management service 202.

In some implementations, the access control service 230 uses the context management service 202 to provide improved access control services. For example, a client of the access control service 230 requests authorization of a request, the client provides contextual information with the request. The access control service 230 authenticates the requester and determines whether the request is authorized based at least in part on the rights and privileges associated with the requester's identity. As an additional verification, the access control service 230 provides the contextual information along with the request to the context management service 202. The context management service 202 validates the request using the provided context and indicates to the access control service 230 whether the request should be allowed.

A database service 234 provides information storage services to database clients. When a database client requests access to information stored within the database, the database service 234 authenticates the identity of the requester and establishes that the requester has adequate rights and permissions to perform the request. The database service 234 uses a context manager agent 236 to contact the context management service 202, and the context manager agent 236 provides various context information such as a timestamp for the requested data, a data owner, and a ticket identifier to the context management service 202. Various context validation plugins can be used to confirm that the database request is in accordance with the context of the database request. In one example, the data windowing plugins 210 restricts the range of data accessible using a request, by comparing the timestamp of requested data to the current time. If the difference between the timestamp of the requested data and the current time is greater than a threshold value, the data windowing plugin 210 causes the request to be denied. In another example, the high-risk operation limiting plugin 218 determines the amount of information that will be altered or removed by the request. If the amount of information that will be altered or removed by the request exceeds a threshold value, the high-risk operation limiting plugin 218 causes the request to be denied. In yet another example, the ticket limiting plugin 214 ensures that the request is associated with a valid ticket identifier. If the request is not associated with a valid ticket identifier, the ticket limiting plugin 214 causes the request to be denied.

A computing service 238 provides computing services to local and online clients. Clients request computing resources and submits jobs for processing to the computing service 238 along with credentials that authenticate the requester and contextual information relating to the request. The computing service 238 includes a context manager agent 240 that provides the contextual information to the context management service 202. The context management service 202 analyzes the contextual information using the set of context validation plugins 206. In some examples, the ticket limiting plugin 214 confirms that the request is accompanied with a valid ticket identifier. In another example, the rate limiting plugin 212 records the amount of computing resources consumed by the requester. When the amount of computing resources consumed by the requester within a particular period of time exceeds a threshold value, the rate limiting plugin 212 causes the request be denied by the computing service 238.

In system 200, the context management service 202 is shown as a component that runs in a separate computer system that is separate from the services that use the context management service. In other implementations, the context management service 202 may be implemented as part of the authentication system within a service, or as part of an access control service such as the Linux Pluggable Authentication Modules ("PAM") system. For example, in the Linux PAM system, and additional authentication module may be added to perform the functions of the context manager agents shown in FIG. 2.

The context checking control component 204 receives the intermediate results from the set of context validation plugins 206, and processes the intermediate results into a final result to be sent to the particular service that requested context checking of a request. The final result that is sent to the particular service can take a number of forms. In some examples, the final result is sent in the form of a digitally signed notification. The digitally signed notification is signed with a private key of a private-public key pair, where the private key is accessible to the context management service 202 and the public key is accessible to the service is requesting context checking services. In another example, the final result is a signed token provided by the context management service 202. The signed token includes an expiration time after which the requesting service must renew the token before approving additional service requests.

Figure 3:
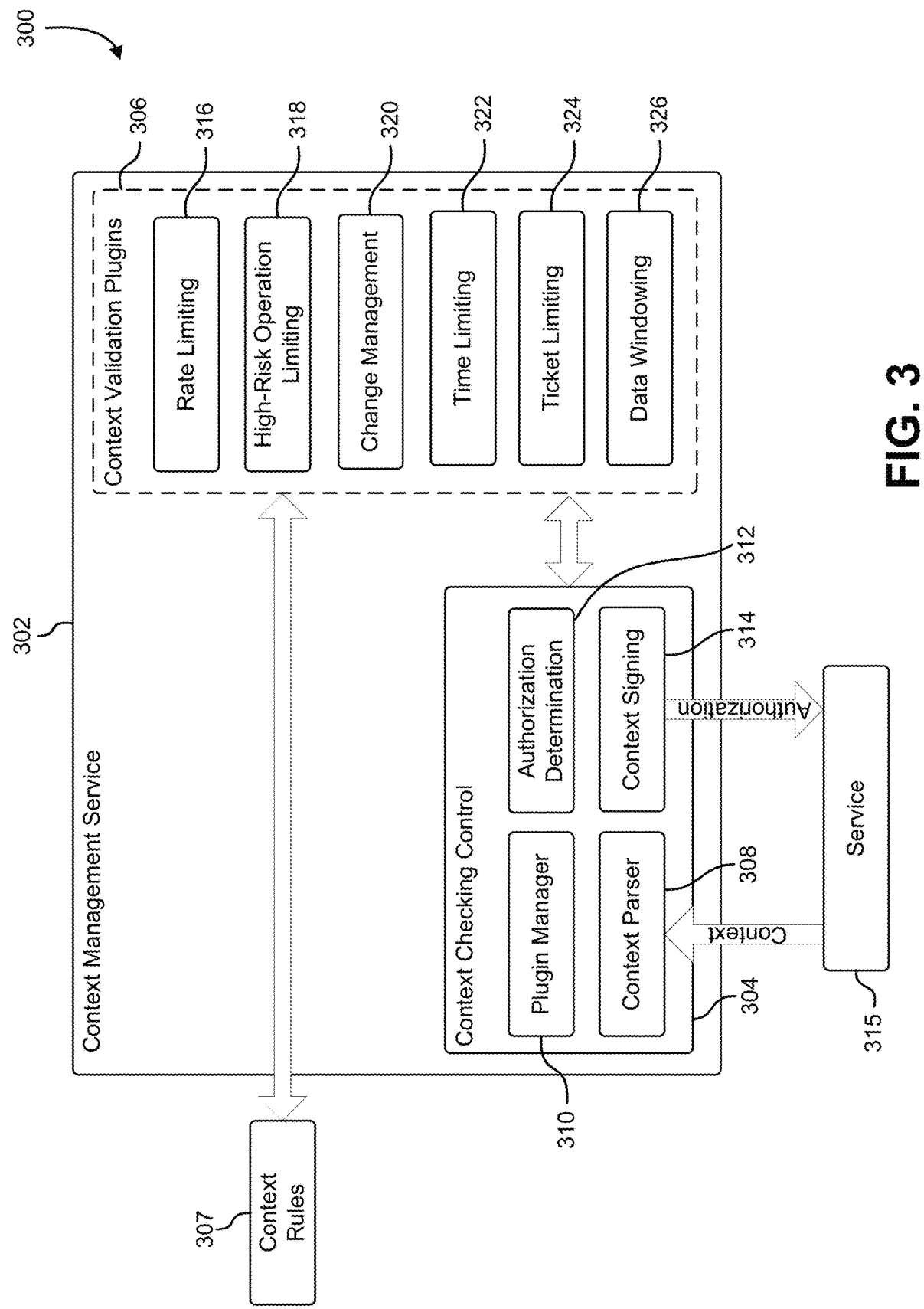
FIG. 3 shows an illustrative example of a context management service, in accordance with an embodiment.

FIG. 3 shows an illustrative example of a diagram 300 of a context management service, in accordance with an embodiment. A diagram 300 shows additional detail of a context management service 302. The context management service 302 includes a context checking control 304 and a set of context validation plugins 306. The set of context validation plugins 306 may access various external components or services to acquire additional context information or to refine various context-based rules 307 used to validate requests. The context checking control 304 includes a context parsing component 308 and plugin manager component 310, an authorization determination component 312, and a context signing component 314. The context parsing component 308 receives context information from a service 315 that is requesting validation of a request based at least in part on the context of the request. The context information is parsed and organized into a standard format that can be read by the various plugins in the set of context validation plugins 306. In one example, the context information received from the service 315 is received by the context parsing component 308 and converted into an extensible markup language ("XML") format. The plugin manager component 310 manages the set of context validation plugins 306. In various implementations, context validation plugins can be added or removed from the system in response to the availability of particular context information or the inclusion of particular context-based constraints in the system. In the illustrative example shown in the diagram 300, the set of context validation plugins 306 includes a rate limiting plugin 316, a high-risk operation limiting plugin 318, a change management plugin 320, a time limiting plugin 322, a ticket limiting plugin 324, and a data windowing plugin 326.

The rate limiting plugin 316 limits the rate at which operations are approved by the system. In one example, the rate limiting plugin 316 records the rate at which requests are received and disapproves requests that exceed a threshold maximum rate of requests per amount of time. In another example, the rate limiting plugin 316 determines the resources consumed by a request, and disapproves of requests that cause the rate of resources consumed to exceed a maximum threshold amount per amount of time.

The high-risk operation limiting plugin 318 limits requests that pose a high risk to the service. In some examples, the high-risk operation limiting plugin determines a risk score for requested operation, and compares the risk score to a maximum risk threshold. The maximum risk threshold can be based at least in part on the state of the requesting system. For example, when a file system is first created, the maximum risk threshold is set to a high level to allow for the initial population and adjustment of data stored on the file system. As the file system stabilizes over time, the maximum risk threshold is reduced, thereby limiting the ability of an attacker to quickly corrupt or delete large amounts of established information. In another example, the context management service adjusts the maximum risk threshold based at least in part on the operational mode of the service. The operational mode of the service may be configured by an administrator. When the service is operating in a pre-production mode, the maximum risk threshold is set to a value which allows dangerous operations such as adding and removing file systems, formatting data volumes, and altering database schemas. When the service transitions to production mode, the context management service decreases the maximum risk threshold to a level that prevents dangerous operations, but allows routine operations such as adding a record to a database table, or reading a log file entry.

The change management plugin 320 accesses information from a change management system to ensure that requests are in accordance with changes that are properly approved and documented. In various examples, the change management plugin 320 approves requests that are associated with approved changes in the change management system, and disapproves requests that have not been properly approved and documented. A change management document ID can be provided to the context checking control 304 by the service 315, or the change management plugin 320 can query the change management system to identify whether the request is in accordance with any approved and documented change.

The time limiting plugin 322 uses the current time and date to determine whether a request should be granted. In some implementations, the time limiting plugin 322 approves requests when the request is made during the scheduled working hours of the requesting entity or person. In another implementation, the time limiting plugin 322 limits access to particular data based at least in part on the timestamp associated with the particular data. A request to access log files is allowed when the log files have been generated within a previous amount of time such as within the last day, week, or month.

A ticket limiting plugin 324 accesses information from a ticketing system to confirm that a request is in accordance with a valid ticket. In some implementations, a ticket identifier is provided with a request to the context management service 302. The ticket limiting plugin 324 contacts a ticketing system and retrieves information regarding the ticket. The information regarding the ticket clues information such as a scope of work to be performed, information regarding the systems affected by the work, and the approval status of the work. If the information regarding the ticket is in accordance with the substance of the request, the ticket limiting plugin 324 allows the request. If the request affects systems outside those specified by the ticket, or if the ticket is not approved, or if there is no ticket provided with the request, the ticket limiting plugin 324 disapproves the request.

A data windowing plugin 326 analyzes meta-information associated with requested data that is to be retrieved changed or deleted. In one example, the data windowing plugin 326 receives a request to modify a log file. The log service determines the creation date of the log file to be modified and provides the creation date of the log file as contextual information to the data windowing plugin 326. The data windowing plugin 326 limits requests that modify log files to a narrow approved window around the current time. If the creation date of the log file is outside the approved window, the data windowing plugin 326 causes the request to be the disallowed. If the creation date of the log file is within the approved window, the data windowing plugin 326 allows the request.

When the context management service 302 receives a request for context validation, the plugin manager component 310 receives the parsed context information from the context parsing component 308 and iterates over context validation plugins in the set of context validation plugins 306. Each context validation plugin indicates to the plugin manager component 310 whether or not the particular context validation plugin approves or disapproves of the received request. In some implementations, a particular context validation plugin may communicate to the plugin manager component 310 that a determination cannot be made and that the particular plugin neither approves nor disapproves of the received request. The plugin manager component 310 performs auditing functions that monitor and report the operational status of the context validation plugins. Actions taken by plugins are captured and recorded in audit logs by the plugin manager component 310. The audit logs may be used by an administrator to troubleshoot problems with the authorization process. If a plugin experiences an operational failure, the plugin may be configured in an audit-only mode that captures information that describes the failure in the audit logs.

The authorization determination component 312 combines the results from the various context validation plugins in the set of context validation plugins 306 to produce a final validation result. In some implementations, the authorization determination component 312 determines the final validation result by determining whether each context validation plugin in the set of context validation plugins 306 either allows the request or at least does not disallow the request. In additional implementations, the authorization determination component 312 determines whether a quorum of the context validation plugins in the set of context validation plugins 306 allow the request. The number of context validation plugins in a quorum may be determined by a majority rule, a ⅔ rule, or by using weighted voting where each context validation plugin in the set of context validation plugins 306 is assigned a particular weight and a threshold total weight of allowing context validation plugins is required to allow the request.

The final validation result is provided by the authorization determination component 312 to the context signing component 314. The context signing component 314 places the final validation result into a final form and transmits the final validation result to the service 315. In some examples, the final form of the final validation result is a digitally signed response that is signed using a cryptographic key that is accessible to the context signing component 314. The cryptographic key can be a symmetric cryptographic key, or an asymmetric public-private key pair. If an asymmetric public-private key pair is used, the final validation result is signed by the context signing component 314 using the private key of the public-private key pair, and the signature is validated by the service 315 using the public key of the public-private key pair. In another example, the final result is a digitally signed token that includes an expiration time. The digitally signed token authorizes requests until the specified expiration time, at which time the digitally signed token may be renewed by the service 315.

Figure 4:
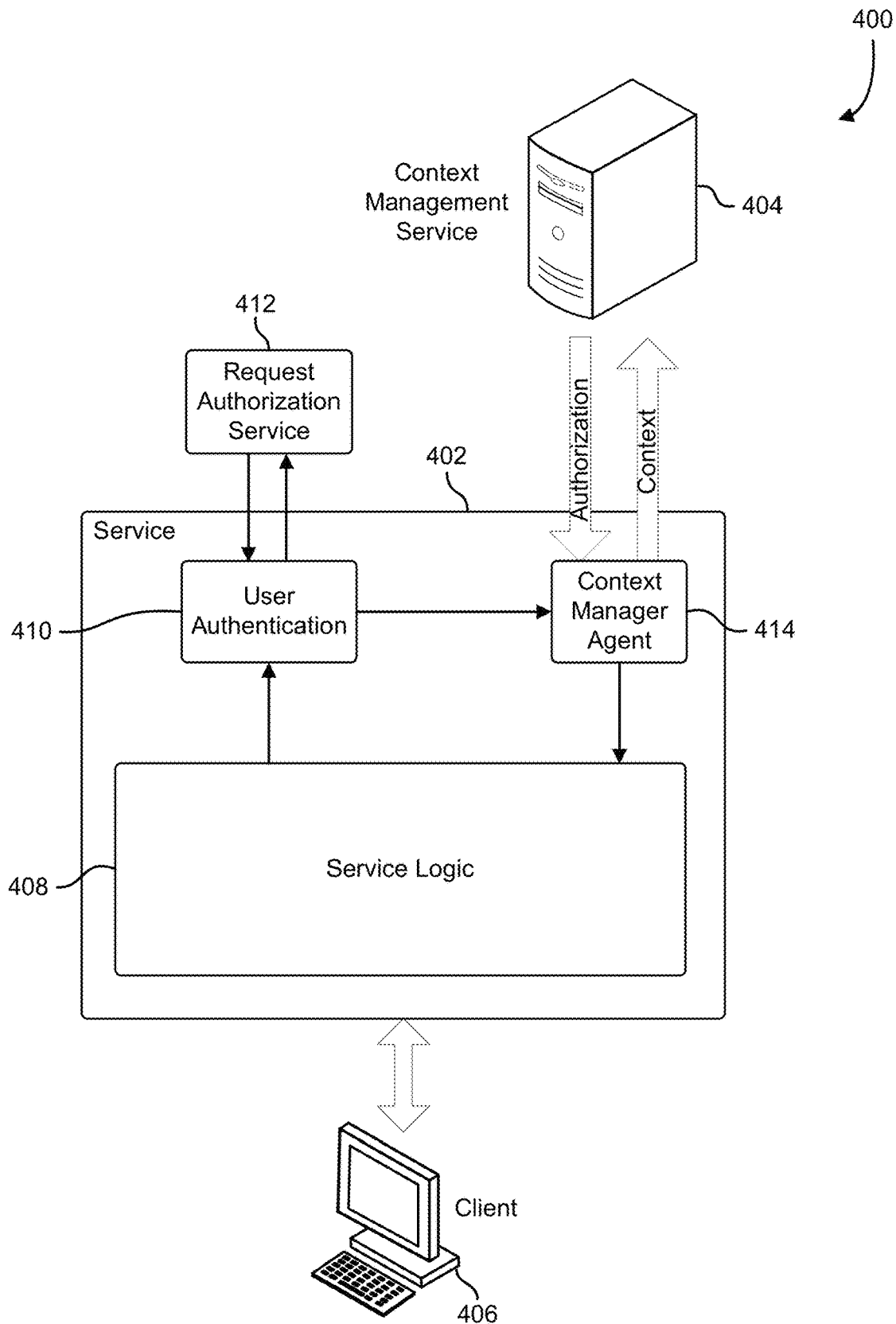
FIG. 4 shows an illustrative example of a service that authorizes requests based at least in part on a context, in accordance with an embodiment.

FIG. 4 shows an illustrative example of a system 400 of a service that authorizes requests based at least in part on a context, in accordance with an embodiment. A system 400 includes a service 402 that request context validation of requests from a context management service 404 that is hosted on an external computer system. A client computer system 406 generates various requests for the services provided by the service 402. A service logic component 408 receives the requests from the client computer system 406 for processing. As part of processing the received request, the service logic component 408 causes the requests to be authenticated, authorized, and validated with various contextual information. A user authentication component 410 verifies the identity of the requester. In some examples, the identity of the requester is verified using a username and password. In another example, the identity of the requester is verified using biometric information. In yet another example, the identity of the requester is verified using a digital signature or digital certificate. In some implementations, the user authentication component 410 can be replaced by a user authentication service outside the service 402. A request authorization service 412 receives to verify the identity of the requester and information relating to the request. The request authorization service 412 identifies a set of rights and privileges associated with the requester, and determines whether the set of rights and privileges is efficient to fulfill the request. If the identified set of rights and religious is sufficient to fulfill the request, the request authorization service 412 authorizes the request, and provides the information related to the request, the requester, and the context surrounding the request to a context manager agent 414.

The context manager agent 414 provides the information related to the request, the requester and the context surrounding the request to the context management service 404. The context management service 404 analyzes the information and determines, based at least in part on the context of the request, whether the request should be allowed. The context management service 404 provides an authorization to the context manager agent 414. The authorization can take the form of a signed token or a digitally signed authorization that is validated by the context manager agent 414. If the context management service 404 indicates that the request is allowed, the context manager agent 414 indicates to the service logic component 408 that the request should be performed. If the context management service 404 indicates that the request is not allowed based at least in part on the context of the request, the context manager agent 414 indicates to the service logic component 408 the request should not be performed.

Figure 5:
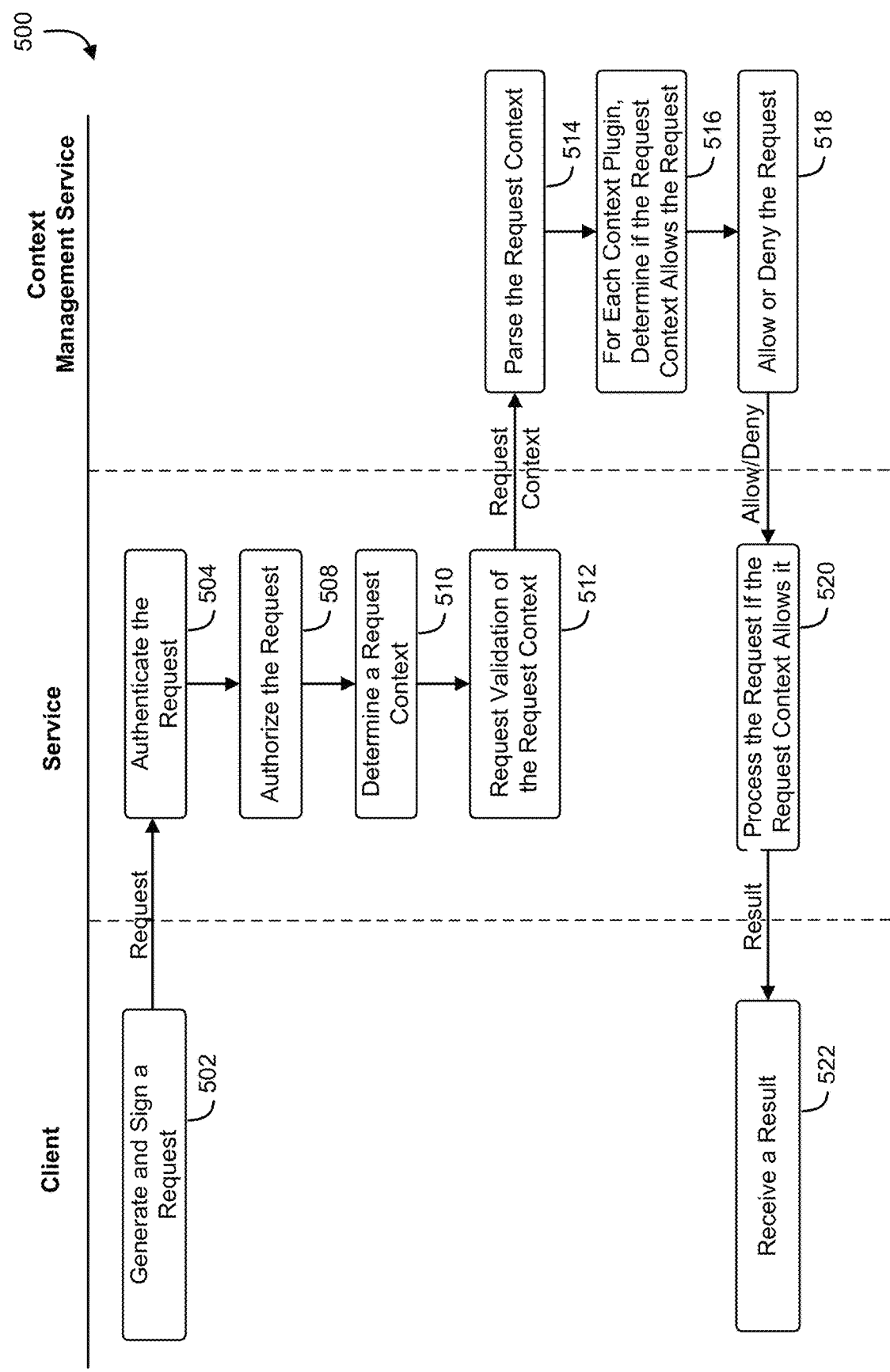
FIG. 5 shows an illustrative example of a process that, when performed by a service, a client of the service, and a context management service, authorizes a request based at least in part on a context, in accordance with an embodiment.

FIG. 5 shows an illustrative example of a diagram 500 of a process that, when performed by a service, a client of the service, and a context management service, authorizes a request based at least in part on a context, in accordance with an embodiment. A swim diagram 500 shows a process that begins at block 502 where the client generates and signs a request with a cryptographic key accessible to the client. The client transmits the request to the service, and at block 504, the service authenticates the request by validating a digital signature of the client. In some examples, the request can be authenticated using a username and a password. The passwords can be stored using a list of one-way hashes that represent the values of the permitted usernames and passwords. If the service determines that the username and password are present in the list of authorized username-password combinations, the service authenticates the identity of the client as being associated with an authorized user that is associated with the provided username.

At block 508, the service identifies a set of rights and permissions that are associated with the requester. If the rights and permissions that are associated with the requester are sufficient to perform the request, the service determines that the request is authorized, and the process proceeds to block 510. If the rights and permissions that are associated with requester are not sufficient to perform the request, the service determines that the request is not authorized, the request is not authorized, and the process is complete. At block 510, the service determines the context associated with the request. Context information can be provided by the client, can be retrieved from external sources such as a change management service, a calendaring service, or ticketing service. Some context information can be determined by examining the request and determining the potential effects of fulfilling the request. In one example, the request is a request to retrieve a portion of the log file. The service examines the log file to determine the creation and modification date of the requested log file information, and includes this context information when requesting context validation of the request.

At block 512, the service provides the information regarding the request, and the request context to the context management service. The context management service parses 514 the context information into a standard format that can be read and processed by a collection of context validation plugins. At block 516, the context management service queries each context validation plugin in the collection of context validation plugins to determine whether the context of the request is in accordance with the request, such that the request should be allowed. In some examples, the context management service determines whether the context of the request is in accordance with the request by determining whether a minimum threshold percentage of the context validation plugins indicate that the request is allowed. At block 518, the context management service communicates to the service whether the request is allowed or denied. The service receives 520 the indication, and if the context management service has indicated that the request is allowed, the service fulfills the request. If the context management service has indicated that the request is denied, the service does not fulfill the request. Results produced as a result of fulfilling the request provided by the service to the client at block 522.

Figure 6:
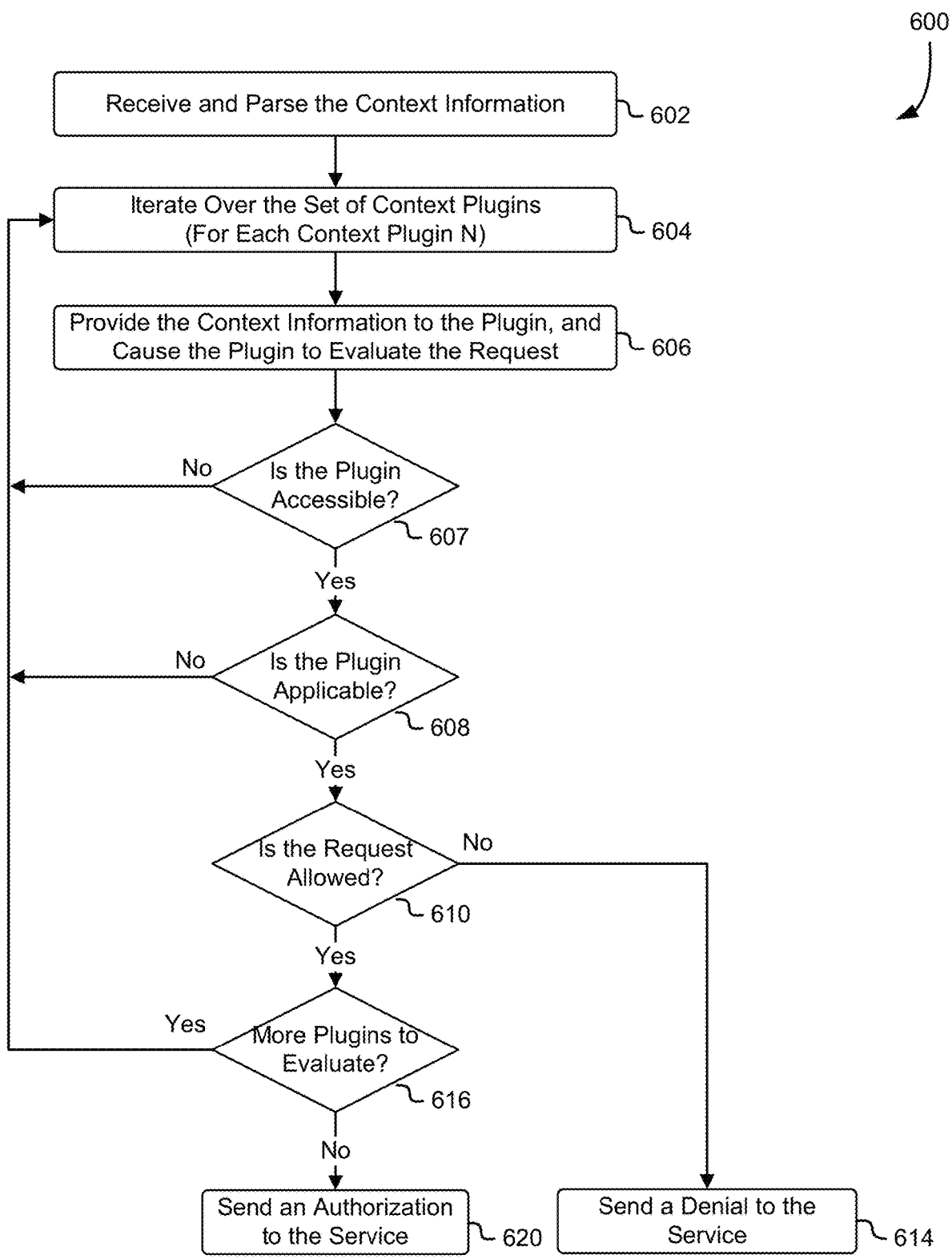
FIG. 6 shows an illustrative example of a process that, when performed by a context management service, determines whether a context allows an operation requested by a service, in accordance with an embodiment.

FIG. 6 shows an illustrative example of a diagram 600 of a process that, when performed by a context management service, determines whether a context allows an operation requested by a service, in accordance with an embodiment. A process diagram 600 begins at block 602 where a context management service receives and parses a collection of context information. The context information is parsed into a format readable by a collection of context validation plugins. The context management service iterates 604 over the set of installed context validation plugins, and performs a sequence of operations with each context validation plugin in the collection of context validation plugins. In some examples, the set of installed context management plugins is ordered so that the iteration over the set of installed context plugins at block 604 occurs in a predetermined manner. The ordering of the context management plugins may be based at least in part on a priority value assigned to each context management plugin. In some embodiments, the amount of resources used to execute each context management plugin is used to determine the ordering of the set of installed context plugins. In examples where the context management service determines whether the context of the request is in accordance with the request by determining whether a minimum threshold percentage of the context validation plugins indicate that the request is allowed, the ordering may be configured to reduce the average number of iterations by determining, prior to evaluating all installed context plugins, whether the requested operation is allowed.

At block 606, the context management service provides the context information to an iterated plugin, and causes the plugin to evaluate the request with the context information. The iterated plugin performs operations specific to the iterated plugin that determine whether the provided context information is in accordance with the present request. At block 607, the context management service determines whether the iterated plugin is accessible. In some examples, a particular iterated plugin may be inaccessible because the plugin has failed to install, or is unreachable over a computer network. If the context management service determines that the iterated plugin is not accessible, execution returns to block 604 and the context management service proceeds to the next plugin. In some implementations, if the context management service determines that the iterated plugin is not accessible, execution proceeds to block 614 and the context management service indicates to the requester that the request is not allowed with the provided context. At block 608, the context management service determines whether the iterated plugin has returned an applicable result. For example, in some implementations the iterated plugin will not return an applicable result because various contextual information is not available, or because the iterated plugin is not constructed to evaluate the particular type of request. If the plugin has not returned an applicable result, execution returns to block 604 and the context management service proceeds to the next plugin. In some implementations, the context management system is able to determine if the plugin is applicable before the plugin is accessible. In such implementations, the order of decision blocks 607 and 608 may be reversed, and the context management system determines whether the plugin is applicable before the context management service determines whether the plugin is accessible. If the plugin has returned an applicable result, execution advances to block 610 where the context management service determines if the iterated plugin allows the request. If the iterated plugin does not allow the request, execution proceeds to block 614 and the context management service indicates to the requester that the request is not allowed with the provided context. At block 610, if the iterated plugin determines that the request is allowed in the provided context, execution advances to block 616. At block 616, the context management service determines if there are additional plugins installed in the context management service, and if so, execution returns to block 604. If there are not additional plugins to be iterated, execution advances to block 620. At block 620, the context management service transmits an authorization to perform the requested operation to the requester.

In some embodiments, a particular context plugin can be configured to override the criteria imposed by the context management service. In some examples, if a number of plugins indicate that a particular request is not allowed, but an override plugin indicates that the particular request is allowed, the context management service authorizes the request notwithstanding the indications received from the remaining plugins. Override functionality may be used in exceptional situations where an administrator is authorized to violate rules imposed by other context plugins.

Figure 7:
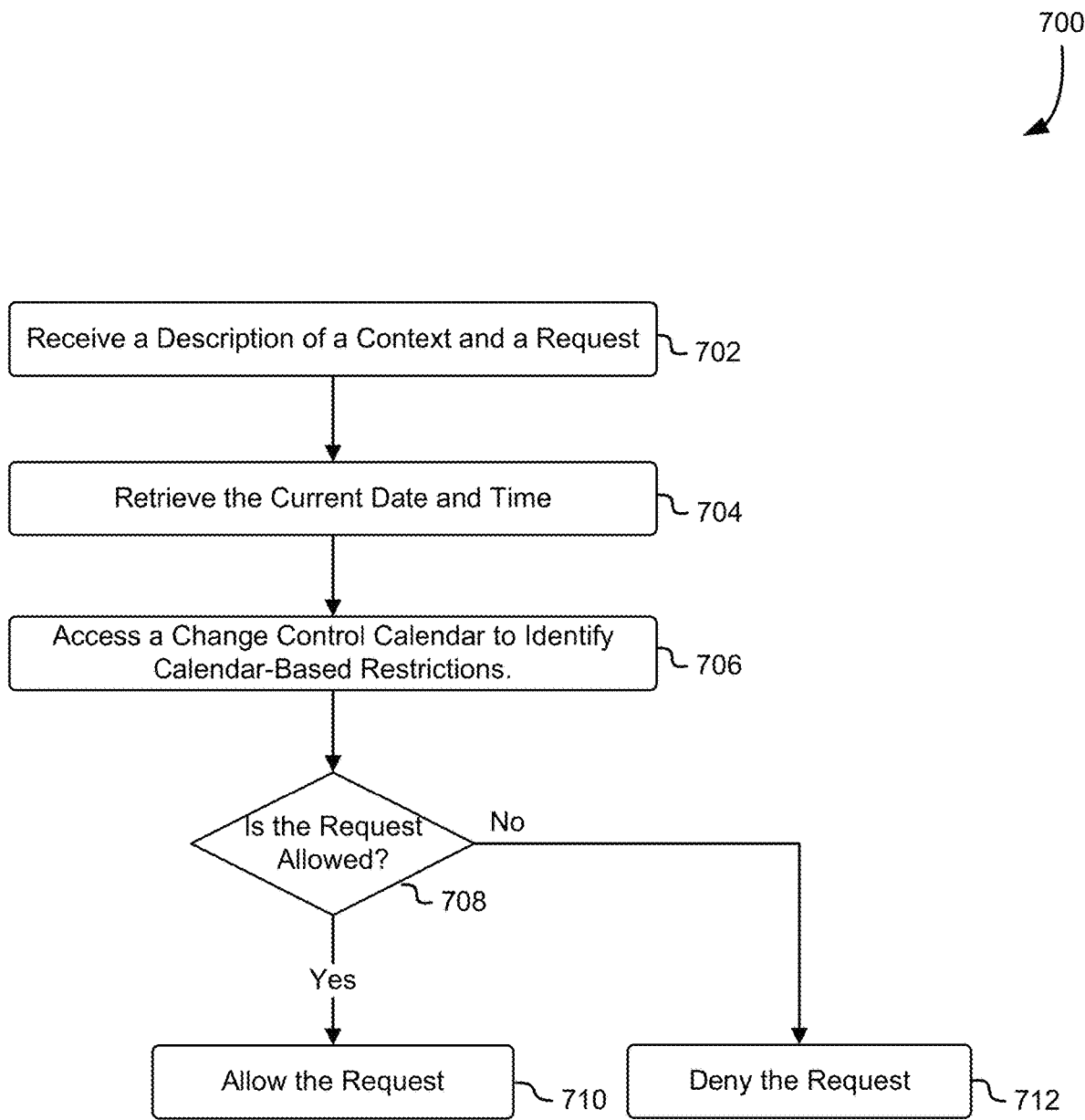
FIG. 7 shows an illustrative example of a process that, when performed by a context validation plugin, determines whether an operation requested by a service is allowed based at least in part on restrictions maintained in a change management calendar, in accordance with an embodiment.

FIG. 7 shows an illustrative example of a diagram 700 of a process that, when performed by a context validation plugin, determines whether an operation requested by a service is allowed based at least in part on restrictions maintained in a change management calendar, in accordance with an embodiment. A process diagram 700 shows a process that begins at block 702 with a context validation plugin receiving information that describes a context and a request. Using a system clock or online time service, the context validation plugin retrieves 704 a current date and time. At block 706, the context validation plugin accesses a change control calendar. The change control calendar contains information organized by date and time that describes time windows associated with various constraints on a system. For example, for an online retailer, the change control calendar indicates time windows that restricts changes to the infrastructure supporting a retail website during the Thanksgiving and Christmas shopping seasons. In another example, a software development company maintains a change control calendar that restricts changes to product source code for a period of time leading up to a software release. In yet another example, a publicly traded company maintains a change control calendar that restricts access to sensitive financial information prior to the dates associated with an earnings announcement.

At block 708, the context validation plugin examines the information in the change control calendar and determines if, based at least in part on the restrictions described in the change control calendar, the request is allowable. If the request is allowable, execution proceeds to block 710 and the context validation plugin determines that the request is allowed and communicates to a plugin manager that the request is allowed by the context validation plugin. If the request is not allowable, execution proceeds to block 712 and the context validation plugin determines that the request is not allowed. In some implementations, at block 712, the context validation plugin communicates to the plugin manager that the request is not allowed.

Figure 8:
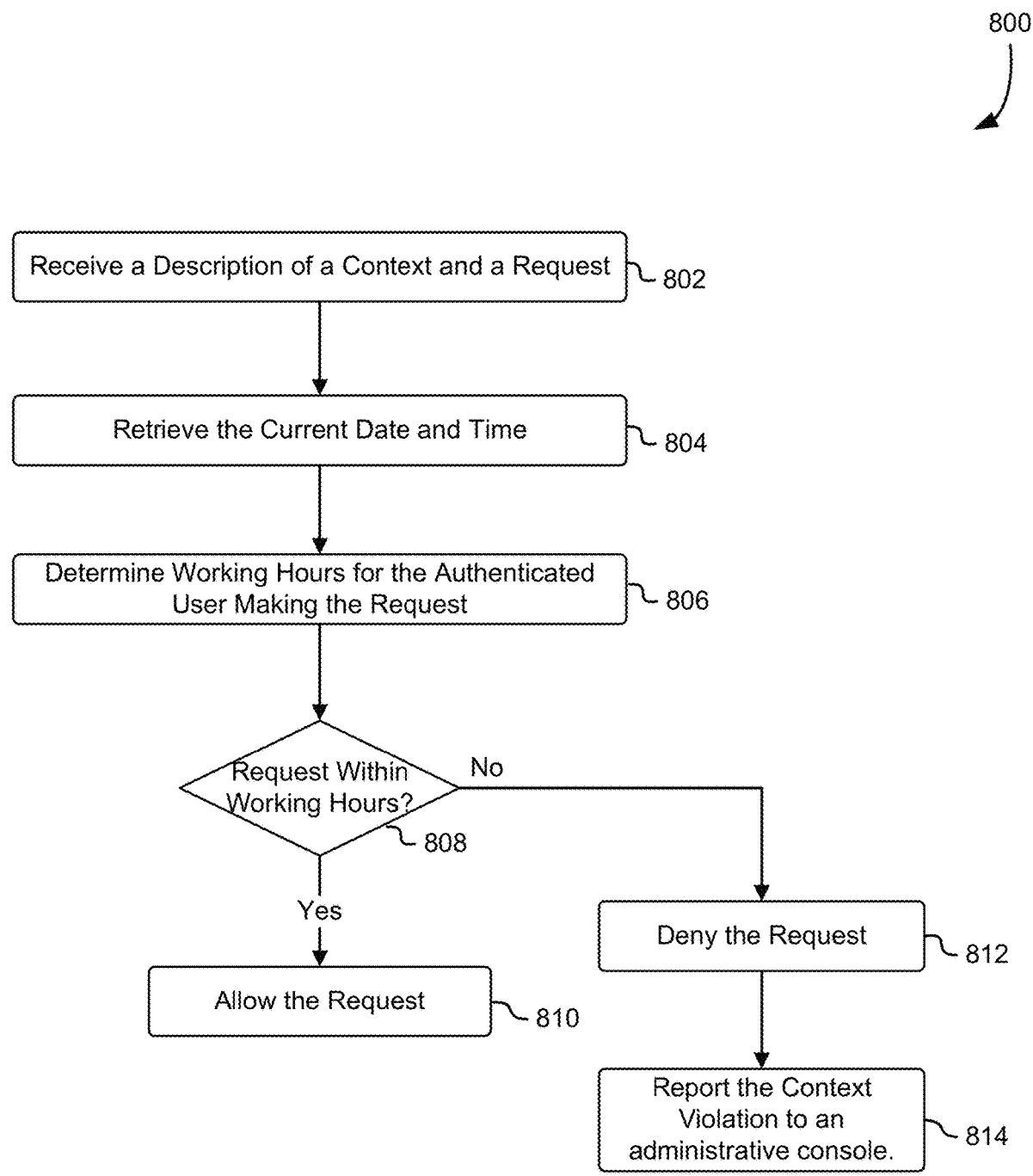
FIG. 8 shows an illustrative example of a process that, when performed by a context validation plugin, determines whether an operation is allowed based at least in part on the identity of the requester and the time the request, in accordance with an embodiment.

FIG. 8 shows an illustrative example of a diagram 800 of a process that, when performed by a context validation plugin, determines whether an operation is allowed based at least in part on the identity of the requester and the time the request, in accordance with an embodiment. A process diagram 800 shows a process that begins at block 802 with a context validation plugin receiving information that describes a request and a request context. The context validation plugin retrieves 804 a current date and time using a network time service or system clock. At block 806, the context validation plugin determines the identity of the requester that submitted the request, and queries personnel management systems to determine the customary working hours of the requester. In some implementations, the customary working hours of the requester are determined by determining the geographical location of the requester, determining the time zone for the location of the requester, and assuming a customary working schedule such as 9 AM to 5 PM local time. In some examples, the context validation plugin can determine whether the requester is on-site or off-site by examining the network connection used by the requester. If the network connection used by the requester is a virtual private network ("VPN") connection, the context validation plug-in can infer that the requester is located off-site. If the network connection used by the requester is not a VPN connection, the network address of the requester can be used to identify an on-site location. In some examples, the citizenship of the requester may be used as contextual information to determine whether a request is granted. Citizenship may be determined by accessing account properties of the requester, or may be inferred based at least in part on the geolocation of the requester.

At decision block 808, the context validation plugin determines if the request has been submitted within the normal working hours of the requester. If the request was submitted within the normal working hours of the requester, the context validation plugin determines 810 that the request is allowed, and communicates that the request is allowed to a plugin manager within a context management service. If the request was not submitted within the normal working hours of the requester, execution of the process proceeds to block 812. At block 812, the context validation plugin determines that the request is not allowed, and communicates that the request is not allowed to a plugin manager within a context management service. At block 814, the context validation plugin reports that a request has been received outside normal working hours to an administrative console. An administrator, monitoring the administrative console can take corrective action by either approving the request, or investigating the security of the account credentials associated with the requester.

Figure 9:
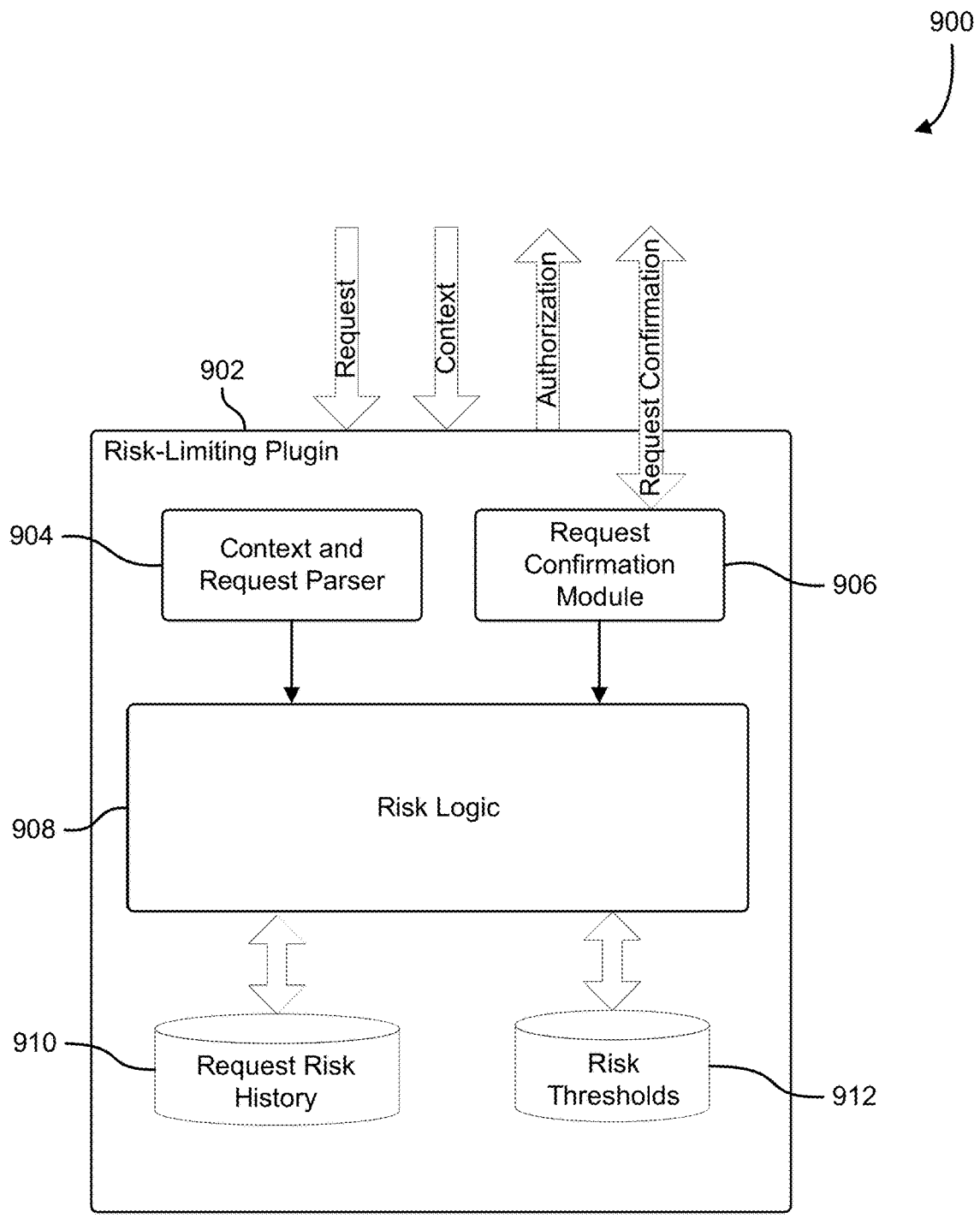
FIG. 9 shows an illustrative example of a risk-limiting plugin, in accordance with an embodiment.

FIG. 9 shows an illustrative example of a block diagram 900 of a risk-limiting plugin, in accordance with an embodiment. A block diagram 900 includes a risk-limiting plugin 902. The risk-limiting plugin 902 includes a context and request parser 904, a request confirmation module 906, a risk logic component 908, a request risk history store 910, and a risk threshold store 912. The context and request parser 904 receives a request and context information from a plugin manager within a context management service in a generic format such as XML. The context and request parser 904 converts the provided information into a format usable by the risk logic component 908. The risk logic component 908 determines an amount of risk associated with a request, and quantifies the amount of risk in the form of a risk score. The risk logic component 908 records information about past requests in the request risk history store 910 that is based at least in part on the determined risk score for past requests. The risk logic component 908 determines whether or not to allow a request based on information in the risk threshold store 912. The risk threshold store 912 can be populated by an administrator using an administrative console, or in some implementations, certain risk thresholds maintained in the risk threshold store 912 can be determined adaptively. In various implementations, the risk threshold store 912 contains a maximum allowable risk score for a request to be granted, a maximum total risk score per hour for requests received from a given requester, and a maximum total risk score per hour for requests that affect a given resource such as a database or computer system.

The request confirmation module 906 is used by the risk-limiting plugin 902 to request confirmation of a request when the request violates certain risk thresholds. In some implementations, when the risk logic component 908 determines that a particular request exceeds a particular risk threshold, the request confirmation module 906 sends a confirmation request to an administrative console so that an administrator can confirm or deny the particular request. If the administrator confirms the particular request, the risk logic component 908 adjusts the particular risk threshold in the risk threshold store 912. If the administrator denies the particular request, or does not confirm the particular request, the particular risk threshold is not adjusted and the particular request is denied.

Figure 10:
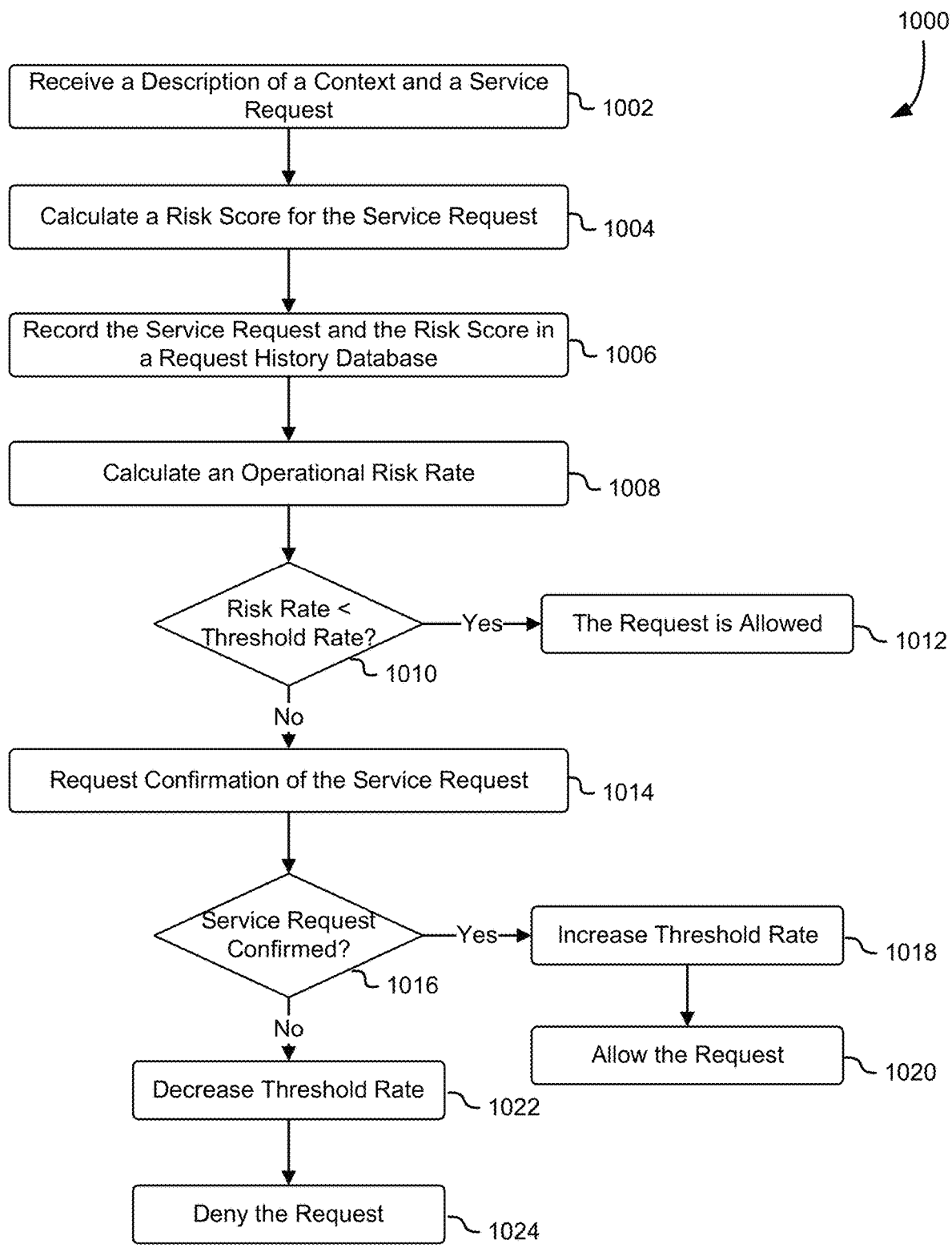
FIG. 10 shows an illustrative example of a process that, when performed by a risk-limiting plugin, determines whether an operation is allowed based at least in part on a risk score associated with the requested operation, in accordance with an embodiment.

FIG. 10 shows an illustrative example of a diagram 1000 of a process that, when performed by a risk-limiting plugin, determines whether an operation is allowed based at least in part on a risk score associated with the requested operation, in accordance with an embodiment. A process diagram 1000 illustrates a process that begins at block 1002 with a risk-limiting plugin receiving information that describes a request and an associated context for the request. At block 1004, the risk-limiting plugin calculates a risk score for the received request. In various embodiments, the risk score is calculated using the type of the request, and the amount of data affected by the request. In one example, the risk score is determined using a multiplier that is based at least in part on the type of the request. The multiplier takes a value of one if the request is a read operation, the multiplier takes a value of 10 if the request is write operation, and the multiplier takes a value of 20 if the request is a delete operation. The multiplier is multiplied by the amount of data affected by the request. For example, a request that describes a read operation that requests five records has a risk score of five (1(multiplier)×5 (records)). In another example, a request that describes a write operation that modifies 10 records has a risk score of 100 (10(multiplier)×10(records)). In yet another example, a request that describes a delete operation that deletes three records has a risk score of 60 (20(multiplier)×3(records)). At block 1006, the risk-limiting plugin updates information in a request risk history store to reflect the received request and the associated risk score of the received request. In some implementations, the risk-limiting plugin records the requester the time of the request, and the risk score associated with the request. In other limitations, the risk limiting plugin records and aggregate risk score for the requester.

Using the information in the request risk history store, the risk-limiting plugin calculates 1008 an operational risk rate. The operational risk rate is a rate at which risk is accumulated with respect to a particular requester or with respect to a particular resource. In some examples, the operational risk rate is the total risk score associated with requests received from a given requester within a particular amount of time such as the total risk of all requests received within the past hour. In some embodiments, the operational risk rate is the total risk score of requests received within the previous week. At decision block 1010, the calculated operational risk rate is compared to a threshold rate. The threshold rate can be determined based on past measurements of operational risk rate during normal business operations, or may be calculated based on hypothetical operations that would require confirmation before approval. If the calculated risk rate is less than the threshold rate, the risk-limiting plugin determines 1012 that the request is allowed, and indicates to the context management service that the request is allowed. If the calculated risk rate is greater than or equal to the threshold rate, execution proceeds to block 1014.

At block 1014, the risk-limiting plugin requests confirmation of the received request from a system administrator or other confirming entity. The risk-limiting plugin determines 1016 whether the received request has been confirmed. If the received request has been confirmed, execution proceeds to block 1018 and the threshold rate is increased. In some examples, the threshold rate is increased to the calculated operational risk rate. In additional examples, the threshold rate is increased to the calculated operational risk rate plus an additional amount to allow for additional requests before confirmation is again requested. At block 1020, the risk-limiting plugin determines that the request is allowed. If the received request is not confirmed, execution proceeds to block 1022 and the threshold rate is reduced to additionally constrain future requests. At block 1024, the risk-limiting plugin determines that the request is not allowed.

Figure 11:
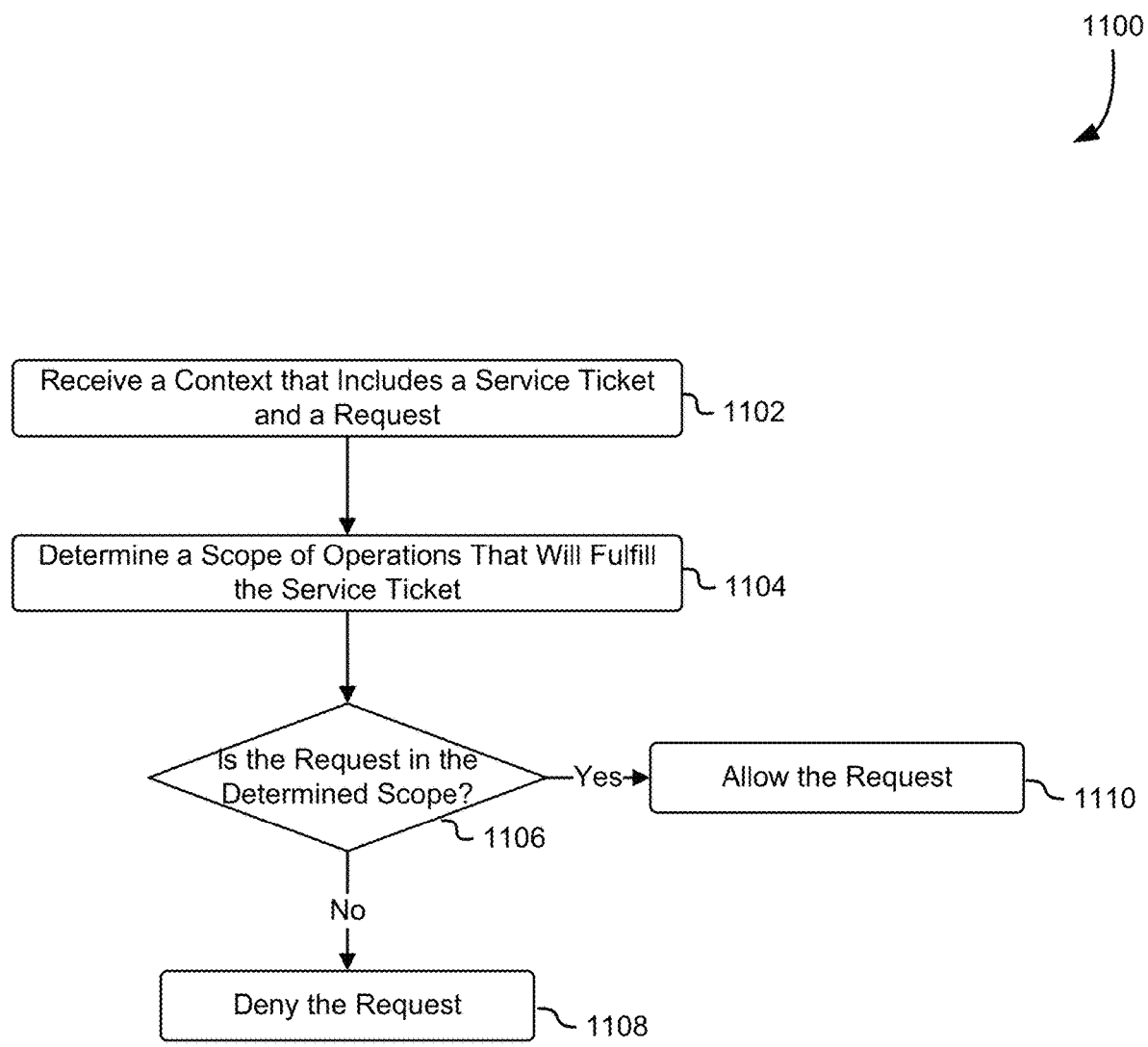
FIG. 11 shows an illustrative example of a process that, when performed by a context validation plugin, determines whether an operation is allowed based at least in part on a scope of allowable operations that are associated with a ticket, in accordance with an embodiment.

FIG. 11 shows an illustrative example of a diagram 1100 of a process that, when performed by a context validation plugin, determines whether an operation is allowed based at least in part on a scope of allowable operations that are associated with a ticket, in accordance with an embodiment. A process diagram 1100 begins at block 1102 where a context validation plugin receives information relating to a request and a context of the request. The information relating to the context of the request includes a ticket identifier for a ticketing service.

At block 1104 the context validation plugin queries the ticketing service using ticket identifier to determine an allowable scope of operations that may be necessary to fulfill the ticket. In some examples, the context validation plugin determines the allowable scope of operations by identifying resources that are named in the ticket such as servers, databases, data tables, and network addresses. In additional examples, the ticket identifies a group of computer systems, and the allowable scope of operations is based at least in part on the membership of the group of computer systems. In yet additional examples, the context validation plugin identifies a type of work described in the ticket, and defines the allowable scope of operations based at least in part on the type of work described in the ticket.

If the context validation plugin determines 1106 that the requested operation is not within the scope of operations that may be necessary to fulfill the ticket, execution proceeds to block 1108, and the context validation plugin does not allow the request. If the context validation plugin determines 1106 that the requested operation is within the scope of operations that may be necessary to fulfill the ticket, execution proceeds to block 1110, where the request is allowed.

Figure 12:
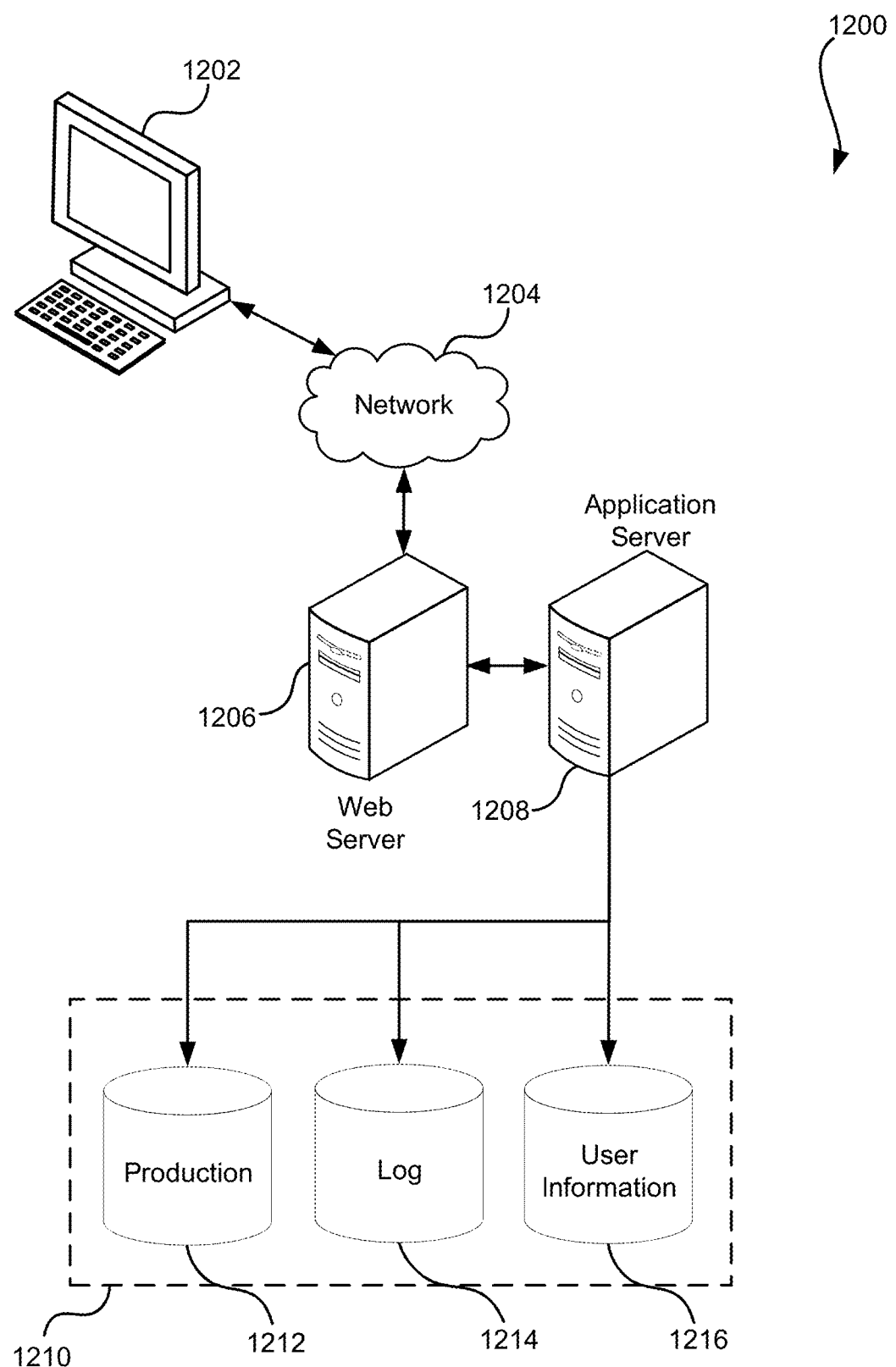
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based at least in part on the disclosure and teachings provided herein, a person of ordinary skill in the art will appreciate other ways and/or methods to implement the various embodiments.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   authorizing, at a web server, a request for access to a resource received by a requestor, where the requestor is an authenticated requestor;
   as a result of determining that the request is authorized, determining whether one or more conditions are applicable to the request;
   performing an operation to determine whether fulfillment of the request is allowable, where the operation includes determining whether information from the one or more conditions satisfies a set of context-based rules, wherein satisfaction of the one or more conditions depends, at least in part, on:
      comparing a timestamp of the request to a specified time period providing temporal access to the resource,
      an origin Internet Protocol (IP) address of a device that sent the request to determine if the IP address of the device is from a specified range of authorized IP addresses within an on-site corporate network; and
      a name of the resource indicated in the request for access to the resource;
   determining that fulfillment of the request is allowable as a result of the one or more conditions satisfying the set of context-based rules; and
   providing, by the web server, access to the resource according to the specified time period to satisfy the request based at least in part on fulfillment of the request being allowable.

2. The computer-implemented method of claim 1, wherein the one or more conditions comprise one or more statements, wherein each of the one or more statements expresses an attribute-based control rule that is compared with the set of context-based rules to determine whether fulfillment of the request is allowable.

3. The computer-implemented method of claim 1, wherein the one or more conditions applicable to the request are based at least in part on the resource or information related to the request.

4. The computer-implemented method of claim 3, wherein the one or more conditions that are based at least in part on the resource further comprise at least one of:
   a name and type of the requested resource.

5. The computer-implemented method of claim 3, wherein the one or more conditions that are based at least in part on the information related to the request include at least one of:
   the timestamp,
   an originating Internet Protocol (IP) address, and
   a destination IP address of the requested resource.

6. A system, comprising:
   one or more processors; and
   memory storing executable instructions that, as a result of execution by the one or more processors, cause the system to:
      receive an access request for a computing resource provided by a computing resource service provider;
      determine whether contextual information related to the access request satisfies a set of context-based policies, wherein satisfaction of the contextual information depends, at least in part, on:
         a network address of the computing resource provided in the access request to determine an allowable scope of operations to be performed using the computing resource,
         an origin network address of a device that sent the request to determine if the request originated from an on-site corporate network or an off-site network, and
         an identity of the computing resource indicated in the access request;
      provide an indication that fulfillment of the access request is allowable as a result of the contextual information satisfying the set of context-based policies; and
      provide access to the computing resource to satisfy the access request based at least in part on the indication.

7. The system of claim 6, wherein access to the computing resource is provided on a temporary basis or with usage limitations on the computing resource.

8. The system of claim 6, wherein the contextual information comprises one or more statements, wherein the system compares each of the one or more statements to the set of context-based policies to determine whether fulfillment of the request is allowable.

9. The system of claim 8, wherein fulfillment of the access request is allowable if one or more statements, when evaluated against the set of context-based policies, indicate an approval.

10. The system of claim 6, wherein the contextual information comprises attributes that are either based at least in part on the requested computing resource or information related to the access request.

11. The system of claim 10, wherein the attributes based at least in part on the requested computing resource include at least one of:
    a name and type of the requested computing resource.

12. The system of claim 10, wherein the attributes based at least in part on the information related to the access request include at least one of:
    a timestamp,
    an originating Internet Protocol (IP) address, and the network address of the computing resource provided in the access request.

13. The system of claim 12, wherein the timestamp indicates a time that the access request is generated for the requested computing resource.

14. A non-transitory computer-readable storage medium comprising executable instructions that, as a result of being executed by one or more processors of a computer system, cause the computer system to at least:
  receive a request generated by an authenticated user to access a computing resource;
  as a result of receiving the request from the authenticated user, determine that the request is authorized;
  determine one or more conditions associated with the request, wherein the one or more conditions comprises one or more attributes to be checked against a set of context-based policies;
  generate an indication that fulfillment of the request is to be performed using the computing resource in accordance with an allowable scope of operations as a result of checking the one or more attributes against the set of context-based policies, wherein the one or more attributes includes:
    an address for the computing resource identified in the request,
    an origin address of a client that sent the request to determine if the origin address is an approved address within a network, and
    a type of the computing resource identified in the request; and
  grant access to the computing resource based at least in part on the indication.

15. The non-transitory computer-readable storage medium of claim 14, wherein access to the computing resource is granted for at least one of:
  a predetermined amount of time and granted with limited access to the computing resource.

16. The non-transitory computer-readable storage medium of claim 14, wherein each of the one or more conditions comprise a title, a description, and an expression.

17. The non-transitory computer-readable storage medium of claim 16, wherein the expression comprises one or more statements, wherein each of the one or more statements expresses an attribute-based control rule that is compared with the set of context-based policies to determine whether fulfillment of the request is allowable.

18. The non-transitory computer-readable storage medium of claim 17, wherein the expression comprises a timestamp applicable to a time the request was generated by the authenticated user.

19. The non-transitory computer-readable storage medium of claim 14, wherein the context-based policies are obtained from policies determined by the authenticated user.

20. The non-transitory computer-readable storage medium of claim 14, wherein the user is determined to be an authenticated user by at least submitting an identity associated with the request to an authentication service and receiving a result that the user is authenticated.

* * * * *